United States Patent [19]

Baumann

[11] Patent Number: 5,583,334
[45] Date of Patent: Dec. 10, 1996

[54] METHOD AND APPARATUS FOR THE DETECTION OF DEFECTIVE LIGHT TRANSMITTERS AND/OR RECEIVERS OF A LIGHT GRID FOR DETECTING OBJECTS IN A SURVEILLANCE AREA

[75] Inventor: Andreas Baumann, Mühlethurnen, Switzerland

[73] Assignee: Erwin Sick GmbH Optik-Elektronik, Waldkirch/Breisgau, Germany

[21] Appl. No.: 338,937

[22] Filed: Nov. 14, 1994

[30] Foreign Application Priority Data

Nov. 15, 1993 [DE] Germany ............. 43 38 978.3

[51] Int. Cl.$^6$ ................................................. G01V 9/04
[52] U.S. Cl. ................ 250/221; 250/559.45; 340/556; 187/316
[58] Field of Search ................ 250/221, 222.1, 250/222.2, 561, 559.45; 340/555–557, 507, 508, 517, 545, 523; 359/154, 155, 159, 177; 187/317, 316, 277

[56] References Cited

U.S. PATENT DOCUMENTS

| | | | |
|---|---|---|---|
| Re. 33,668 | 8/1991 | Gray ............................. | 250/221 |
| 4,654,920 | 2/1987 | Carroll ......................... | 250/221 |
| 5,149,921 | 9/1992 | Picado ......................... | 187/317 |
| 5,225,691 | 7/1993 | Powers et al. ................ | 250/561 |
| 5,319,216 | 6/1994 | Mokuo et al. ................ | 250/561 |

FOREIGN PATENT DOCUMENTS

| | | |
|---|---|---|
| 2329982 | 6/1973 | Germany . |
| 2262118 | 6/1974 | Germany . |
| 2329938 | 1/1975 | Germany . |
| 2540741 | 3/1977 | Germany . |
| 2552314 | 6/1977 | Germany . |
| 2738306 | 3/1979 | Germany . |
| 3601516 | 7/1987 | Germany . |
| 3603927 | 8/1987 | Germany . |
| 3620227 | 8/1987 | Germany . |
| 3840493 | 1/1990 | Germany . |
| 3939191 | 5/1991 | Germany . |
| 4100280 | 7/1991 | Germany . |
| 934519 | 10/1980 | U.S.S.R. . |

*Primary Examiner*—Que T. Le
*Attorney, Agent, or Firm*—Townsend and Townsend and Crew

[57] ABSTRACT

A light grid consists of a row (13) of adjacent light transmitters ($11_i$) and adjacent light receivers ($12_i$) arranged at a distance opposite to the latter. The light transmitters ($11_i$) and the associated light receivers ($12_i$) are individually activated cyclically one after the other. A determination is made at each light receiver ($12_i$) whether a received light signal is present or not on activation of the associated light transmitter ($11_i$). By considering, during the evaluation, the light receivers ($12_{i-1}$, $12_{i+1}$) adjacent to the associated light receiver ($12_i$) and the light transmitters ($11_{i+1}$, $11_{i-1}$) adjacent to the associated light transmitter ($11_i$), a differentiation is made between an obstacle introduced into the protective field (26) and a defect light transmitter ($11_i$) and/or light receiver ($12_i$).

9 Claims, 4 Drawing Sheets

METHOD AND APPARATUS FOR THE DETECTION OF DEFECTIVE LIGHT TRANSMITTERS AND/OR RECEIVERS OF A LIGHT GRID FOR DETECTING OBJECTS IN A SURVEILLANCE AREA

BACKGROUND OF THE INVENTION

This invention relates to a method for the detection of defective light transmitters and/or light receivers at a light grid and to a light grid for carrying out this method.

With such light grids the light transmitters, which are normally arranged in a row, are sequentially switched on one after the other in a continually cyclically repeating manner. A light receiver is associated with each light transmitter and is synchronously activated with the associated light transmitter, so that each light receiver normally can receive light from only a specific light transmitter. The synchronization of the light transmitters and light receivers can take place over a connecting line between the light transmitter row and the light receiver row (DE 24 09 113 B2) and also through a suitable coding of the light transmitter pulses to which the light receivers are matched. A synchronization of light transmitters and light receivers without an electrical connecting line between the light transmitter and light receiver rows is also possible by providing a synchronization pause between the light pulses of the last and first light transmitters of the light transmitter row (DE-OS 38 03 033).

Such light grids are generally used to secure areas which are to be protected, such as for example the opening of an elevator entrance at the closing edges of the elevator door, in order, in the case of an obstruction or encroachment, for example by the hand of the user, to bring about a stopping or reversal of the closing movement of the door. If a light transmitter and/or a light receiver fails with such a light grid then the evaluation circuit evaluates this as an encroachment and transmits a corresponding alarm signal which is generally a switch off or reversal signal and/or a light signal and/or an acoustic signal.

Frequently a light grid is however still operable when only a few light transmitters and/or light receivers have failed; nevertheless, in all known light grids, the failure of only a single light transmitter and/or light receiver requires that the defective component be exchanged before the light grid is operable again. In this way long periods of disuse must be tolerated, for example with elevators, in particular when the failure of a component takes place on a weekend and several days can pass before the arrival of a servicing specialist.

SUMMARY OF THE INVENTION

It is therefore an object of the invention to provide a method and a light grid of the initially named kind which make it possible for the light grid to be operated further even after the failure of one or more light transmitters and/or light receivers, i.e. so that its availability is ensured even when individual components are defective.

The basic concept of the invention is to be seen in taking account of the light transmitters and light receivers adjacent to the associated light transmitters and light receivers, and also of a corresponding cross-illumination, so that a component adjacent to the failed component takes on its function for a period of time in the context of a diagnostic procedure, whereby a defect of the relevant component can be distinguished with a high degree of certainty from an obstruction of the light grid.

As soon as a defective component has been detected, the light grid, which has first transmitted an alarm signal that led to the switching off or reversal of the door drive, can be taken into operation again, while the defective light transmitter-receiver pair is switched off. In this way a warning indication should expediently indicate the failure of one component pair so that replacement can be effected, for example during the next routine inspection.

It is particularly advantageous if, in the absence of an expected received signal, at least an alarm signal is transmitted, with the consequence of a switching off or reversal process, and if this alarm is converted into a warning as soon as it has been shown that the alarm probably did not result from an obstruction by an obstacle but rather from a defective component.

Whereas a diagnosis could be carried out following each normal scanning cycle, it is preferred to make a check for defective components only when the expected reception signal has been absent for a longer period of time at one light receiver. If it turns out during the subsequent diagnosis that neighboring light receivers also receive no light, or that light is not received from neighboring light transmitters, then this is an indication that an obstacle, for example a case, is present in the field protected by the light grid, so that the switching off or change-over which has been brought about from the point of view of safety must be maintained. If however it transpires that a constellation of reception results is present which makes the presence of an obstacle improbable, but a defect at an optoelectronic component probable, then the switching off or reversal can be cancelled and replaced by a warning signal.

The light transmitters and light receivers should preferably have such an extent, or such a distance from one another, that the obstacles to be expected cover at least two light beams so that on the entry or encroachment of such obstacles into the protected field an alarm signal is always given which leads to a permanent switching off, or to a change-over, which is also retained after the diagnosis. Smaller obstacles will then first trigger an alarm signal when they are arranged very close to one light transmitter or light receiver but this will be cancelled and replaced by a warning signal after the diagnostic procedure has been carried out.

BRIEF DESCRIPTION OF THE DRAWINGS

FIGS. 8a to 8k are schematic illustrations of various interrupted and defective states of two light transmitters $11_i$, $11_{i+1}$ picked out from the light transmitter row of a light grid of the invention and of the two associated light receivers $12_i$, $12_{i+1}$.

DETAILED DESCRIPTION OF THE PREFERRED EMBODIMENTS

Figure 1:
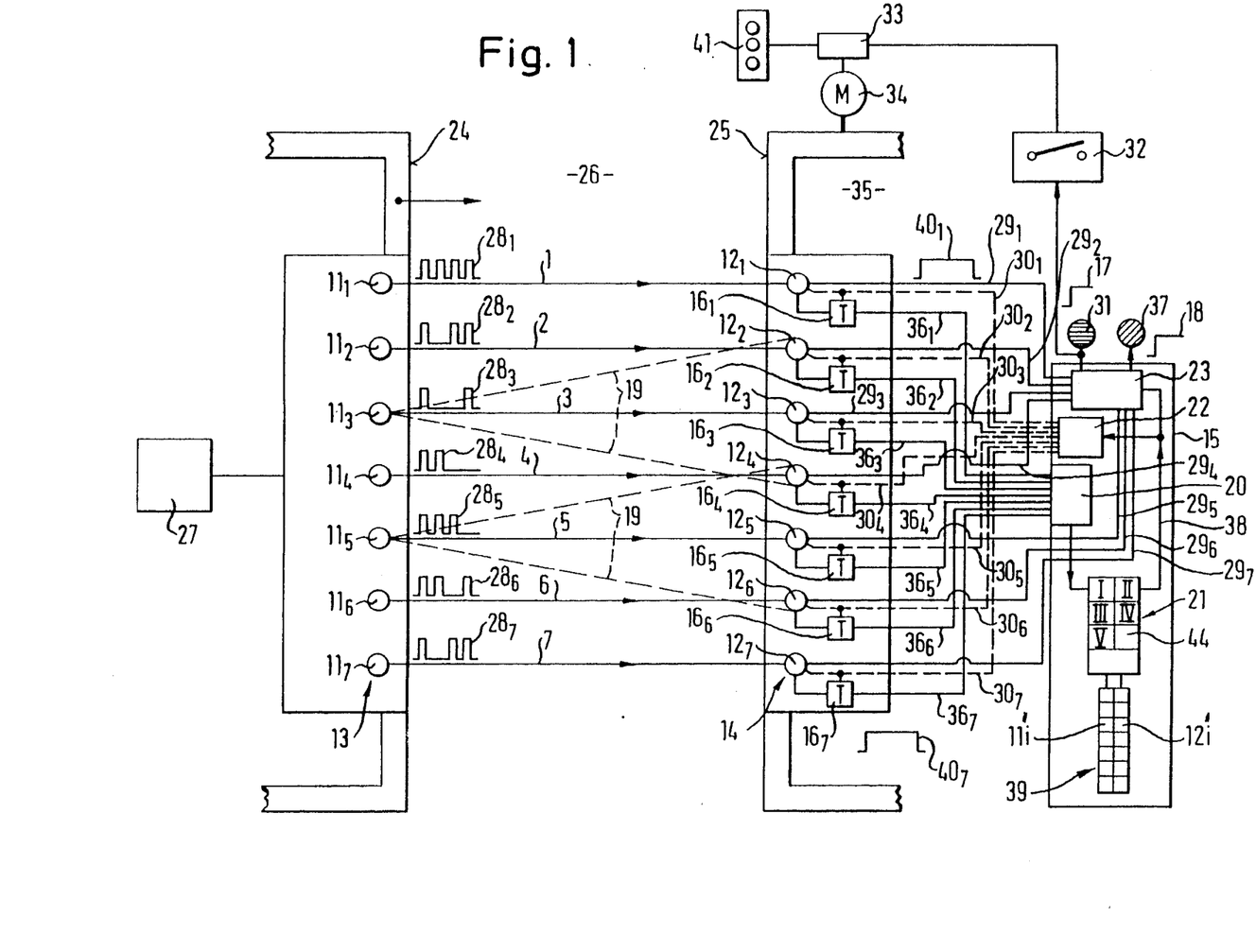
FIG. 1 is a schematic block circuit diagram of a light grid made in accordance with the invention when arranged at a lift door.
Figure 2:
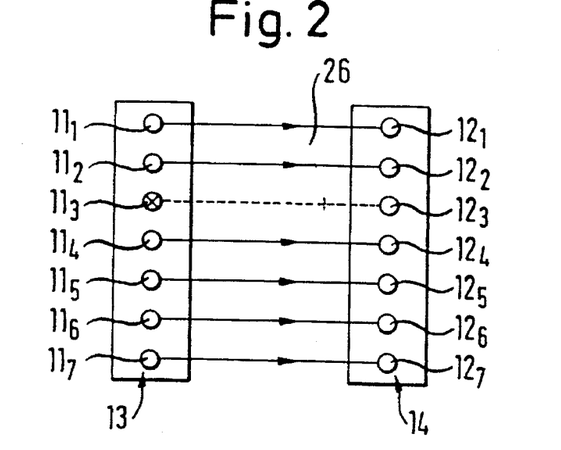
FIG. 2 shows a portion of FIG. 1 during a normal scanning cycle with a defective light transmitter.

In FIG. 1 the entrance or exit opening of a lift or elevator is assumed to be the field 26 protected by a light grid and is bounded at the left-hand side by a fixed closing edge 24 and at the right by a closing edge 25 provided on a sliding door 35.

Behind the closing edge 24 a row of light transmitters $11_1$ is $11_7$ is vertically arranged. A control apparatus 27 causes the transmitters to cyclically transmit light pulses $28_1$ to $28_7$ provided with an individual coding. Each light transmitter $11_1$ transmits on activation by the control apparatus 27 a divergent light beam 19 through the protected field 26 to a vertical row 14 of light receivers $12_1$ to $12_7$ at the oppositely disposed closing edge 25 of sliding door 35. In FIG. 1 the light beam 19 is only indicated for the light transmitters $11_3$, $11_5$. The divergence of the light beam 19 is sufficiently large so that it not only reaches the associated light receiver (for example $12_3$, $12_5$) but also the neighboring light receivers (for example $12_2$, $12_4$ and $12_6$) and can there trigger a reception signal provided the light receiver considered is activated together with the light transmitter.

Each light receiver $12_i$ is connected via a reception line $29_1$ to $29_7$ with a received signal evaluation stage 23 within an evaluation circuit 15. An announcement is made via the reception lines $29_i$ to the received signal evaluation stage when a light receiver $12_i$ receives no light from the associated light transmitter $11_i$ on the expected transmission of a light pulse $28_i$. In this case the received signal evaluation stage 23 transmits an alarm signal 17 both to an alarm lamp 31, which for example lights up red, and also to a switching device 32 which acts on a control means 33 for the drive motor 34 of the lift door 35 in such a way that as soon as an alarm signal 17 appears at the output of the received signal evaluation stage 23 the switching means 32 changes the motor 34, which is for example just closing the door 35, to operate in the opposite direction so that the closing movement of the lift door 35 is terminated and an opening movement is initiated.

The light receivers $12_1$ to $12_7$ are controlled via control lines $30_1$ to $30_7$ (indicated in broken lines) by a receiver control means 22 provided in the evaluation circuit 15 so that they normally recognize only the light pulses $28_1$ to $28_7$ of the associated light transmitters $11_1$ to $11_7$. Each light receiver $12_i$ is thus respectively activated together with the associated light transmitter $11_i$.

The receiver control device 22 associates the individual receivers $12_1$ and $12_7$ with the light transmitters $11_1$ to $11_7$ via the control lines $30_1$ to $30_7$ in such a way that one receiver $12_i$ is normally only sensitive to the light pulse $28_i$ of the light transmitter $11_i$. A diagnostic apparatus 21 connected to the receiver control means 22 can however also provide other associations, for example in such a way that the receivers $12_{i+1}$ or $12_{i-1}$ are sensitive for the light pulse $28_i$ of a light transmitter $11_i$.

The diagnostic apparatus 21 of the evaluation circuit 15 is acted on by a defect detection stage 20 which is likewise part of the evaluation circuit 15 and to which the output signals of timers $16_1$ to $16_7$ are passed which are, respectively, connected to the light receivers $12_1$ to $12_7$.

The timers $16_1$ to $16_7$ are moreover connected via control lines $30_1$ to $30_7$ to the receiver control apparatus 22 in such a way that the timers $16_i$ are advised when a received signal from the associated light transmitter $11_i$ can be expected by the associated light receiver $12_1$ to $12_7$.

The timers $16_i$ are so formed that they can be started in the absence of an expected received signal at the associated light receiver $12_i$ and can be stopped and set back into the initial state when the associated light receiver $12_i$ receives a light signal again from the associated light transmitter $11_i$ within a preferably presettable timing period.

If the associated light receiver $12_i$ does not again receive a light signal from the associated receiver $11_i$ before the expiration of the preset time then it transmits a corresponding signal to the defect detection stage 20 via its connecting line $36_1$ to $36_7$. This then triggers the diagnostic procedure in the attached diagnostic apparatus 21. Depending on the result of this diagnostic procedure, the alarm signal 17 is either maintained, i.e. the alarm lamp 31 is switched on and the switching device 32 is changed, or the alarm signal 17 disappears, the alarm lamp 31 is switched off, and the switching means 32 is switched back again. However, a warning signal 18 then appears at a further output of the received signal evaluation stage 23 and causes an attached warning lamp 37 (e.g. of yellow color) to light up.

The manner of operation of the described light grid will now be described with reference to FIGS. 1 to 4.

In normal operation the light transmitters $11_i$ transmit the light pulses $28_1$ to $28_7$ one after the other and separated from one another timewise as well as in a cyclically continuously repeating manner. The light receivers $12_i$ are clocked in the same rhythm and know, as a result of the special coding of the individual light pulses, and the synchronization between the row of light transmitters 13 and the row of light receivers 14, when a light pulse has to be received from the associated light transmitter $11_i$. If a light pulse of this kind is received within the time window which is provided then a corresponding received signal 40 is transmitted via the lines $29_i$ to the received signal evaluation stage 23, which thus indicates a free protected field 26 within the relevant light beam 1, 2, 3, 4, 5, 6 and 7. If all light receivers $12_i$ receive the light signal $28_i$ associated with them, then the received signal evaluation stage 23 recognizes that the protected field 26 is free and the closing procedure of the lift door 25 can be initiated in the normal manner from the customary automatically and/or manually operated closing initiation device 41 via the control apparatus 33.

If now at least one of the light beams 1 to 7 is interrupted prior to or during the closing procedure then the absence of a corresponding received signal $40_i$ at the associated light receiver $12_i$ momentarily triggers an alarm signal 17 via the received signal evaluation stage 23. This causes the red alarm lamp 31 to light up and switches the switching device 32 to "change-over", so that the motor 34 is controlled to run in the door opening direction. At the same time the light receiver $12_i$, which has not received a received signal at a specific time, starts the associated timer $16_i$.

If the relevant light receiver $12_i$ receives again a received signal from the associated light transmitter $11_i$ at a specified time before the expiration of the preset timer period of, for example, two minutes, then the timer $16_i$ is switched off and is reset to the initial state. At the same time the alarm signal 17 is switched off via the received signal evaluation stage 23 in view of the received signal $40_i$ which is now periodically present again and the switching device 32 is again changed over so that the closing movement of the door 35 is initiated anew. The alarm lamp 31 is turned off.

Of the pulse-like received signals $40_i$ only the two signals $40_i$ and $40_7$ are indicated by way of example in FIG. 1.

If a received pulse $40_i$ is absent at a specific light receiver $12_i$ for a time longer than that preset at the timer $16_i$ then the relevant timer transmits a corresponding signal via its output line $36_i$ to the defect detection stage 20. It then initiates a diagnostic procedure in the diagnostic apparatus 21 which will be described below with reference to FIGS. 2 to 4.

Figure 8:
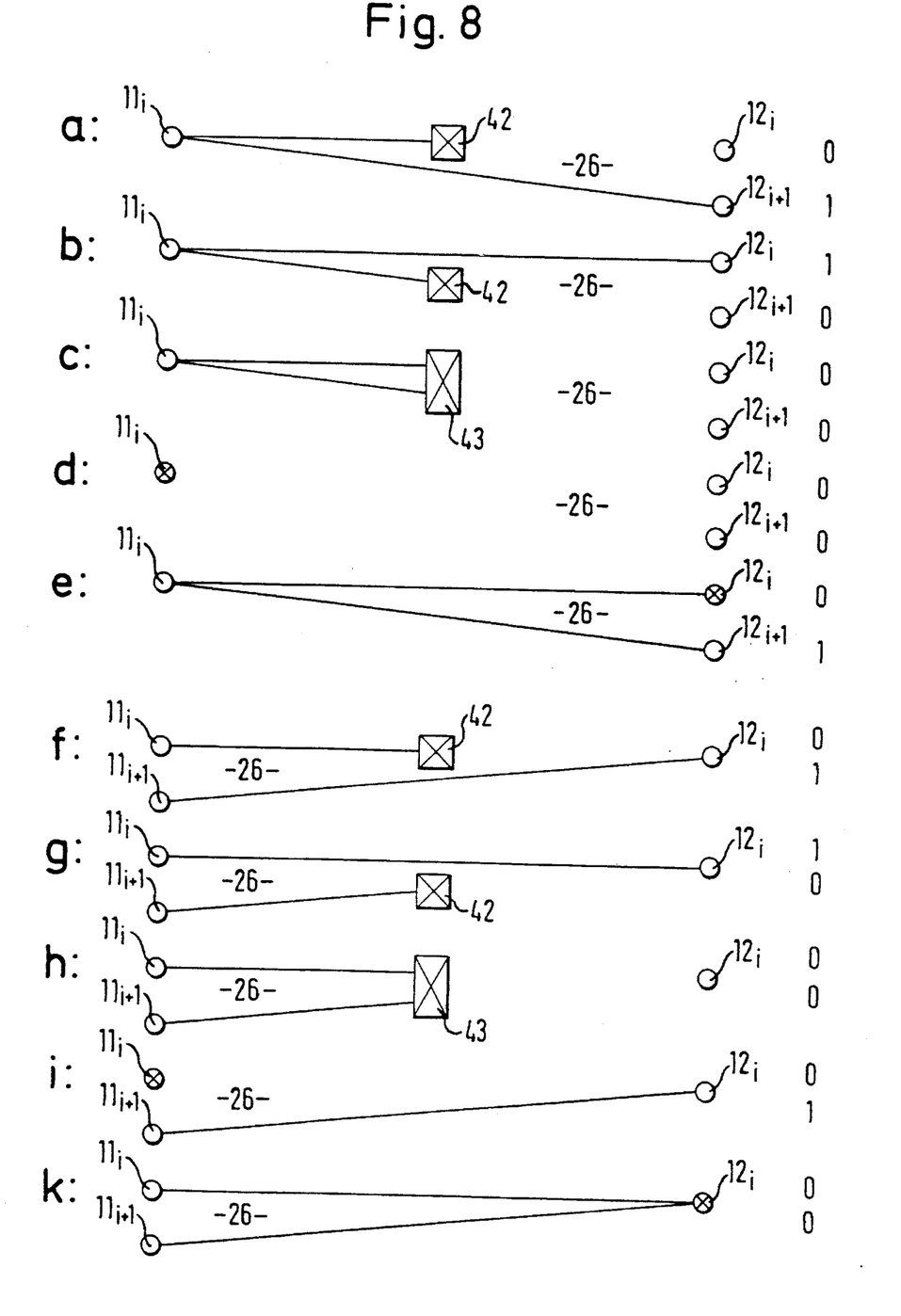

Referring to FIG. 8, the principle of differentiation in accordance with the invention between obstacles in the field of protection 26 and defects of a light transmitter $11_i$ of a light receiver $12_i$ will first be explained.

In FIGS. 8a to 8k consideration is given to an arbitrarily selected light transmitter $11_i$ and an associated light receiver $12_i$ of the light grid. It is assumed (FIGS. 8a to 8e) that a light receiver $12_{i+1}$ adjacent the light receiver $12_i$ can be likewise switched timewise in such a way that it receives light from the light transmitter $11_i$ and transmits a corresponding electrical signal. Furthermore, it can be assumed (FIGS. 8f to 8k) that the light receiver $12_i$ is switched timewise in such a way that it receives light from a light transmitter $11_{i+1}$ adjacent to the light transmitter $11_i$ and can transmit a corresponding electrical signal.

A "0" or "1" is in each case set out behind the individual FIGS. 8a to 8k depending on whether in the relevant example the preceding light receiver $12_i$ or $12_{i+1}$ transmits a received signal or not.

In FIG. 8a a small obstacle 42 is illustrated in the direct beam between the light transmitter $11_i$ and the light receiver $12_i$. It does not interrupt the light beam extending from the light transmitter $11_i$ to the neighboring light receiver $12_{i+1}$.

Insofar as all three optoelectronic components are in order the light receiver $12_i$ transmits no received signal "0" whereas the light receiver $12_{i+1}$ transmits a light received signal "1".

If the small obstacle 42 in FIG. 8b is located only in the beam between the light transmitter $11_i$ and the light receiver $12_{i+1}$ then the output signals of the two light receivers $12_i$ and $12_{i+1}$ are reversed to "1" and "0", respectively.

In accordance with FIG. 8c a large obstacle 43 in the protected field 26 interrupts both light beams from the light transmitter $11_i$ to the light receivers $12_i$ and $12_{i+1}$. In this manner both light transmitters transmit the output signal "0".

In FIG. 8d it is assumed that the light transmitter $11_i$ is defective and that no obstacle is present in the protected field 26. In this case the two (intact) light receivers $12_i$ and $12_{i+1}$ transmit the output signal "0".

In FIG. 8e it is assumed that the light receiver $12_i$ is defective and that no obstacle is present in the protected field 26. The result is an output signal "0" at the light receiver $12_i$ and an output signal "1" at the light receiver $12_{i+1}$.

In accordance with FIGS. 8f to 8k two light transmitters $11_i$, $11_{i+1}$ are associated with the same light receiver $12_i$ one after the other. In accordance with FIG. 8f a small obstacle is present in the light beam between the light transmitter $11_i$ and the light receiver $12_i$ so that the light receiver $12_i$ sequentially transmits the received signals "0" and "1".

In the case of FIG. 8g a small obstacle 42 is present in the light beam between the light transmitter $11_{i+1}$ and the light receiver $12_i$. The received signals sequentially transmitted by the light receiver $12_i$ are "1" and "0", respectively.

If, in accordance with FIG. 8h, a large obstacle 48 is introduced which interrupts both light beams, the output signals of the light receiver $12_i$ are each "0".

In FIG. 8i it is assumed that the light transmitter $11_i$ is defective and that no obstacle is present in the protected field 26. This results in sequential output signals "0" and "1" at the light receiver $12_i$.

In the case of FIG. 8k light receiver $12_i$ is defective. This leads to an output signal "0", both when the light transmitter $11_i$ transmits light and also when the light transmitter $11_{i+1}$ transmits light.

The different output signals of the receivers $12_i$ and $12_{i+1}$ respectively can be deposited in a memory where they are available for the purpose of logical combination.

If one compares the five cases of FIGS. 8a to 8e then one finds that first of all one cannot distinguish between a large obstacle 43 and a defective light transmitter, or between a small obstacle 42 in the light beam and a defective light receiver $12_i$, since in both cases the output signals (in the one case 0/0 and in the other case 0/1) are the same.

The cases of FIGS. 8c and 8d are however distinguishable if one also adds the further examination in accordance with FIGS. 8h and 8i, since here the case of the defective light transmitter $11_i$ can be distinguished by the fact that in the case of FIG. 8i the light receiver $12_i$ receives light from the light transmitter $11_{i+1}$. If, therefore, the output signals of the light receivers $12_i$, $12_{i+1}$ are linked with one another in accordance with FIGS. 8c, d, h, i, then a logic circuit can distinguish between a large obstacle 43 and a defective light transmitter.

After a defective light transmitter $11_i$ has been found the relevant light transmitter-receiver pair $11i/12_i$ can be switched off and the light grid can continue to operate without this pair.

The output signal pair generated in accordance with FIGS. 8a and 8e can be distinguished by the further examination in accordance with FIGS. 8f and k. The case of a small obstacle 42 in the light beam leads to an output signal constellation 0 1 0 1, whereas with a defective light receiver $12_i$ the received signal constellation is 0 1 0 0.

Cases can also be conceived where it is not possible to distinguish between a defective optoelectronic component and an obstacle. An example of this kind is a piece of chewing gum stuck onto a light transmitter $11_i$, or onto a light receiver $12_i$, which interrupts the light beam path. In this case a defective component would be signalled. This is desirable since in such cases further operation of the light grid with lower resolution is desired.

As a result of the logic combinations in accordance with the invention a warning signal 18 can thus be given when a defective optoelectronic component is probable. An alarm signal 17 can be transmitted when the presence of an obstacle 42 or 43 is probable.

It can also be seen from FIG. 8 that it is possible to straightforwardly distinguish between a defective light transmitter $11_i$ and a defective light receiver $12_i$.

For the case of a defective light transmitter $11_i$ one can find a received signal constellation 0 0 0 1 as is illustrated in FIGS. 8d and 8i.

For the case of a defective light receiver a received signal constellation 0 1 0 0 results as is illustrated in FIGS. 8e, k.

In a light grid there is the additional problem that the last light receiver can normally receive no light from a light transmitter following the associated light transmitter and that the first light receiver can only receive light from the associated light transmitter, but not from a preceding light transmitter (which is located at the end of the row of light transmitters). Accordingly the criteria for the distinction between obstacle and defects and also for the recognition of the defective component must be further refined. This will be explained in the following with reference to FIG. 1:

It is assumed that the failure of the light transmitter $11_3$ is the reason for the absence of a received signal $40_3$ at the light receiver $12_3$. This triggers an alarm signal 17 at the output of the received signal evaluation stage 23. In this way the associated timer $16_3$ reaches the time which has been set and triggers the diagnostic procedure in the diagnostic apparatus 21 via the defect detection stage 20. First of all the state of the individual light transmitters and receivers is stored as follows in a memory pair I provided in the diagnostic apparatus 21:
Memory I:

| Transmitter state | Receiver state |
|---|---|
| $11_1$: 1 | $12_1$: 1 |
| $11_2$: 1 | $12_2$: 1 |
| $11_3$: 0 | $12_3$: 0 |
| $11_4$: 1 | $12_4$: 1 |
| $11_5$: 1 | $12_5$: 1 |
| $11_6$: 1 | $12_6$: 1 |
| $11_7$: 1 | $12_7$: 1 |

"1" signifies that during the last scanning cycle a received signal $40_i$ was detected at the relevant light receiver $12_i$. "0" signifies that during the last scanning cycle no light was received at the relevant light receiver $12_i$. Since it is initially not possible to find out whether this is to be attributed to an obstacle, to a defective light transmitter $11_i$, or to a defective light receiver $12_i$, the state of both the light transmitter (in the present example $11_3$) and also of the light receiver (in the present case $12_3$) is identified as "0".

A state "0" is thus associated with the light transmitter $11_3$ and also with the light receiver $12_3$ because it is not evident from the absence of a received signal whether this is to be attributed to a failure of the light transmitter $11_3$ of the light receiver $12_3$ or an obstacle in the light beam 3.

Figure 3:
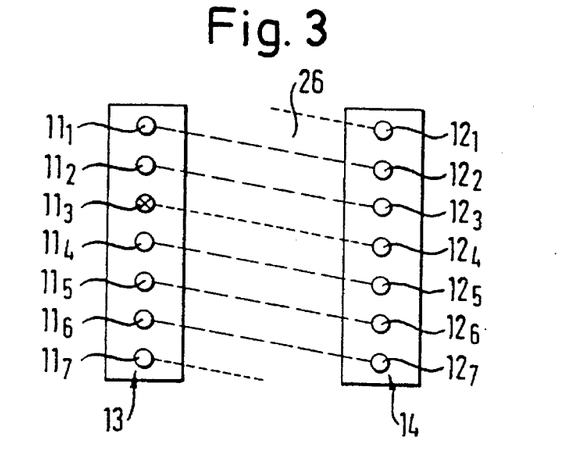
FIG. 3 is a view analogous to FIG. 2 during a first diagnostic scanning cycle in accordance with the invention.

As soon as stored in memory I (in accordance with the preceding table of states), the diagnostic apparatus 21 switches the light receiver $12_i$ via the receiver control device 22 in such a way that, in place of the normally associated light receiver $12_i$, the next respective light receiver $12_{i+1}$ is associated with a specific light transmitter $11_i$. The individual light receivers $12_i$ are thus made sensitive for the light pulses of the respectively preceding light transmitter $11_{i-1}$ and synchronized with the latter. The scanning cycle which is now carried out is indicated in FIG. 3.

Under the above-made assumption that the light transmitter $11_3$ is defective, and as a result of the fact that an adjacent light receiver lower than the light receiver $12_7$ cannot be associated with the last light transmitter $11_7$ and that no preceding light transmitter can be associated with the first light receiver $12_1$ the following status is stored in a memory II of the diagnostic apparatus 21 for the state of the individual light transmitters and receivers:
Memory II:

| Transmitter state | Receiver state |
|---|---|
| $11_1$: 1 | $12_1$: 0 |
| $11_2$: 1 | $12_2$: 1 |
| $11_3$: 0 | $12_3$: 1 |
| $11_4$: 1 | $12_4$: 0 |
| $11_5$: 1 | $12_5$: 1 |
| $11_6$: 1 | $12_6$: 1 |
| $11_7$: 0 | $12_7$: 1 |

Since the light pulse to be transmitted from the defective light transmitter $11_3$ during this scanning cycle is expected by the displaced light receiver $12_4$ of the light receiver row 14, but does not arrive there because of the defect of the light transmitter $11_3$, both the state of the transmitter $11_3$ and also that of the light receiver $12_4$ is evaluated with "0". The state of the last light transmitter $11_7$ and of the first light receiver $12_1$ is also evaluated as "0" because the light transmitted from the last light transmitter $11_7$ cannot reach the first light receiver $12_1$ and thus a received signal $40_1$ does not arise. Should however the light bundle 19 emerging from the last light transmitter $11_7$ be sufficiently divergent that it reaches the first light receiver $12_1$ and can be received by the latter, then the state "1" could also be associated with the last light transmitter $11_7$ and the first light receiver $12_1$.

Figure 4:
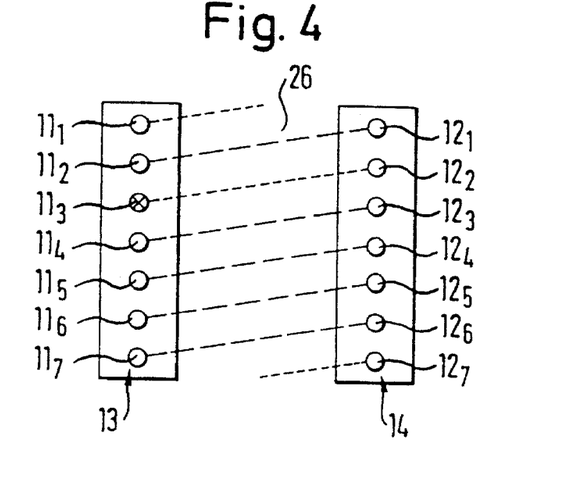
FIG. 4 is a view analogous to FIGS. 2 and 3 during the subsequent second diagnostic scanning cycle.

Following this a further scanning cycle is carried out in accordance with FIG. 4 with each light transmitter $11_i$ being associated with a light receiver $12_{i-1}$ which precedes the light receiver $12_i$ normally associated in the scanning cycle.

In analogy to FIG. 3 the states of the individual components $11_i$, $12_i$ are then retained as follows in a further memory III of the diagnostic apparatus 21:
Memory III:

| Transmitter state | Receiver state |
|---|---|
| $11_1$: 0 | $12_1$: 1 |
| $11_2$: 1 | $12_2$: 0 |
| $11_3$: 0 | $12_3$: 1 |
| $11_4$: 1 | $12_4$: 1 |
| $11_5$: 1 | $12_5$: 1 |
| $11_6$: 1 | $12_6$: 1 |
| $11_7$: 1 | $12_7$: 0 |

Since the defective light transmitter $11_3$ is now associated with the light receiver $12_2$ the state "0" must be associated with these two optoelectronic components. In analogy to the light transmitter $11_7$ and the light receiver $12_1$ in the scanning cycle of FIG. 3 the states "0" are associated with the light receiver $11_1$ and the light receiver $12_7$ in the scanning cycle of FIG. 4 so far as the light receiver $12_7$ cannot receive light from the light transmitter $11_1$ as presently assumed.

Within the diagnostic apparatus these state functions are now subjected as follows to an "OR" combination separately for the transmitter row 13 and receiver row 14, with the result of the OR combination being stored in a memory IV of the diagnostic apparatus:
Combination of the receiver state signals:

| Normal cycle (FIG. 2) | Cycle with receivers displaced downwardly (FIG. 3) | Cycle with receivers displaced upwardly (FIG. 4) | Results of the OR combination |
|---|---|---|---|
| 1 | 0 | 1 | 1 : $12_1$ |
| 1 | 1 | 0 | 1 : $12_2$ |
| 0 | 1 | 1 | 1 : $12_3$ |
| 1 | 0 | 1 | 1 : $12_4$ |
| 1 | 1 | 1 | 1 : $12_5$ |
| 1 | 1 | 1 | 1 : $12_6$ |
| 1 | 1 | 0 | 1 : $12_7$ |

Combination of the transmitter signals:

| Normal cycle (FIG. 2) | Cycle with receivers displaced downwardly (FIG. 3) | Cycle with receivers displaced upwardly (FIG. 4) | Results of the OR combination |
|---|---|---|---|
| 1 | 1 | 0 | 1 : $11_1$ |
| 1 | 1 | 1 | 1 : $11_2$ |
| 0 | 0 | 0 | 0 : $11_3$ |
| 1 | 1 | 1 | 1 : $11_4$ |
| 1 | 1 | 1 | 1 : $11_5$ |
| 1 | 1 | 1 | 1 : $11_6$ |
| 1 | 0 | 1 | 1 : $11_7$ |

From the result retained in the content of memory IV it can now be straightforwardly seen that the third light transmitter $11_3$ and not the light receiver $12_3$ is defective. The same effect could also be triggered by an obstacle located directly in front of the light transmitter $11_3$, for example chewing gum stuck onto the transmitter lens such as occasionally happens in elevators. However, in such cases there is also interest in the further availability of the light grid.

The two results held in the memory IV are now subjected to an "AND" combination in the following manner:

| Result of the OR combination at the receiver side | Result of the OR combination at the transmitter side | AND combination |
|---|---|---|
| 1 | 1 | 1 |
| 1 | 1 | 1 |
| 1 | 0 | 0 |
| 1 | 1 | 1 |
| 1 | 1 | 1 |
| 1 | 1 | 1 |
| 1 | 1 | 1 |
| 1 | 1 | 1 |

Since the "0" is still present after carrying out the diagnosis procedure of the invention in just the same way as with the normal cycle of FIG. 1 the logic present in the diagnostic apparatus 21 concludes that a defect of the component is present. It can be recognized from the result stored in the memory IV that the defective component is the light transmitter $11_3$. The result of the AND-linkage can be stored in a memory V of the diagnostic apparatus 21.

As soon as this finding has been received by the diagnostic apparatus 21 it is forwarded via a line 38 to both the receiver control device 22 and the received signal evaluation stage 23. The receiver control device 22 then switches off the relevant light receiver $12_3$ so that the received signal evaluation stage 23 no longer takes account of the signals from the light receiver $12_3$. At the same time the alarm signal 17 is switched off so that the switching device 32 which is switched to door opening is switched over into its normal state and the alarm lamp 31 is switched off. At the same time the warning signal 18 appears at the output of the received signal evaluation stage 23 so that the yellow warning lamp 37 is switched on. This shows the user that the light grid is still working but with a lower spatial resolution. In this way the service personnel is also made aware of the requirement to change the defective component.

An internally visible display 39, or also an externally visible display with light diodes $11'_i$ and $12'_i$ associated with the individual light transmitters $11_i$ and light receivers $12_i$, can reproduce the states retained in the memory IV of the individual components optically in such a way that a service technician servicing the installation at once recognizes which component of the light grid is defective. It can then be repaired or replaced without further measurements or investigations so that the light grid can be returned to its optical operating condition with a minimum expenditure of time.

Figure 5:
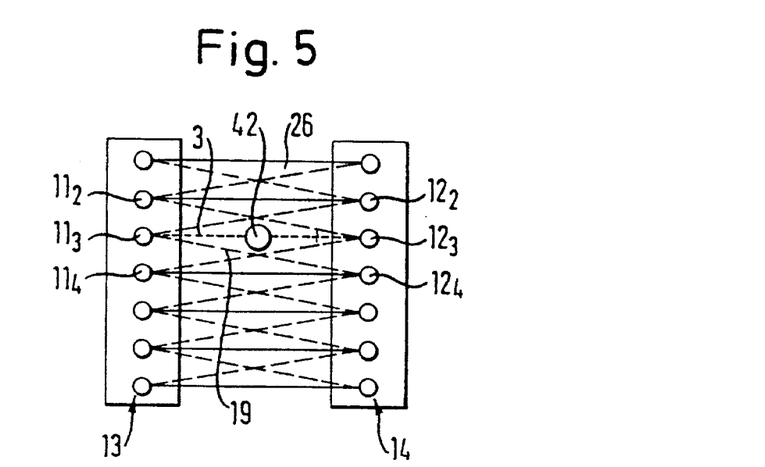
FIGS. 5 to 7 illustrate various examples of encroachments into the protective field of the light grid of the invention.

In FIGS. 5 and 8, in addition to the light beams shown in full lines between the mutually associated light transmitters $11_i$ and light receivers $12_i$, there are also shown in broken lines the side beams corresponding to the scanning cycles of FIGS. 3 and 4 in order to more easily judge the effect of obstacles 42, 43 which may be present in the protected field 26.

FIG. 5 schematically shows the encroachment of a relatively small obstacle 42 into the protected field 26 which interrupts the direct light beam 3 between the light transmitter $11_3$ and the light receiver $12_3$ but not the light beams extending from the light transmitter $11_3$ to the neighboring light transmitters $12_2$ and $12_4$. Since the light receiver $12_3$ receives light from the light transmitter $11_2$, and is thus recognized as operating in a problemfree manner, and since the light receiver $12_2$ receives light from the light receiver $11_3$, and thereby recognizes that the latter is operating in a troublefree manner, a status analysis as follows results on carrying out the diagnostic procedure of the invention in the memories I and V:

| Memory I: | | Memory V: |
|---|---|---|
| Transmitter | Receiver | |
| 1 | 1 | 1 |
| 1 | 1 | 1 |
| 0 | 0 | 1 |
| 1 | 1 | 1 |
| 1 | 1 | 1 |
| 1 | 1 | 1 |
| 1 | 1 | 1 |

The alarm signal 17 triggered by the absence of the third received signal $40_3$ (memory I) is thus maintained even after carrying out the diagnostic procedure of the invention and is not replaced by the warning signal 18 since the problemfree state of all optoelectronic components results from the result of the AND-combination stored in the memory V.

Thus a small obstacle, such as is assumed in FIG. 5, is also recognized as such in a problemfree manner by the light grid of the invention.

Figure 6:
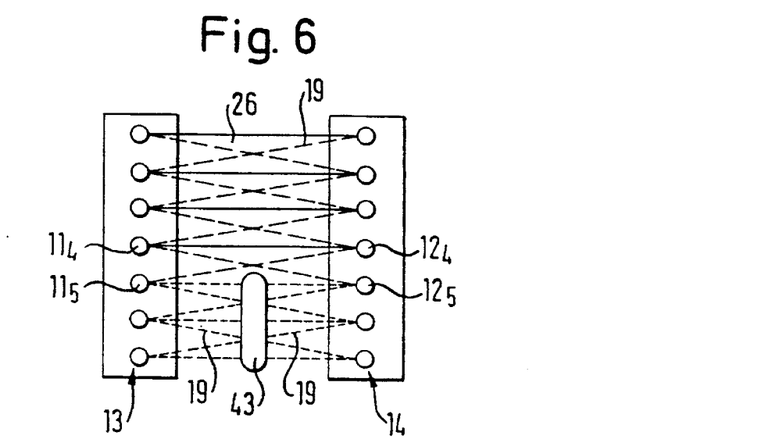

If, in accordance with FIG. 6, a relatively large obstacle 43, for example a case or a briefcase, is placed in the protected field 26 in such a way that several light beams 19 are interrupted an alarm signal 17 is generated because it has been recognized that the two lower light beams 19 are completely interrupted and the obstacle 43 is recognized as such. The alarm lamp 31 then continues to burn in just the same way as the switching device 32 remains switched to the state related to door opening.

Figure 7:
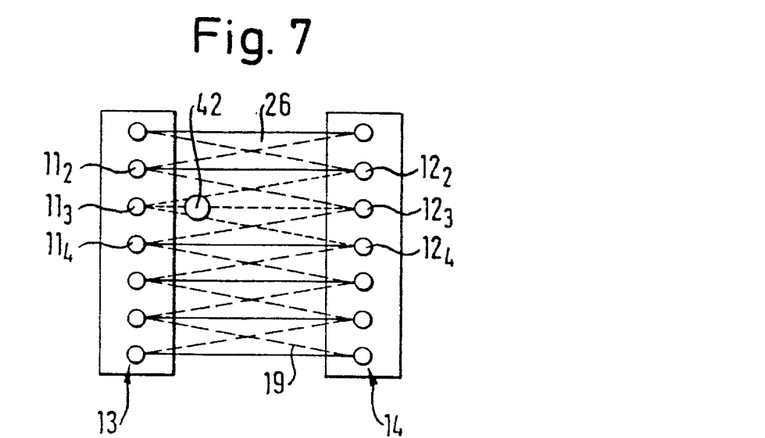

In FIG. 7 a relatively small obstacle 42 is again shown. It is very close to the light transmitter $11_3$ so that it interrupts all the light beams passing to the light receivers $12_2$, $12_3$ and $12_4$. This state is interpreted in the same way by the light grid of the invention as a defective light transmitter $11_3$. After the expiration of the time of the timer $16_3$ the light grid is again freed to continue executing its function while switching off the light transmitter-receiver pair $11_3$, $12_3$. If the small obstacle 42 for example consists of chewing gum stuck onto the transmitter lens of the light transmitter $11_3$ then this state is nondangerous. If however, which is very improbable, an obstacle is located in the protected field 26 directly in front of the light transmitter $11_{13}$ then the elevator door 35 would continue to close further. However, elevators have other safety devices, for example a slipping clutch, which can respond to the jamming of an obstacle 42 between the closing edges 24, 25 and would thus prevent an accident.

In accordance with the invention the diagnostic apparatus 21 for the recognition of two neighboring defective components contains a further component which then continues to maintain the alarm state triggered by the interruption of only one light beam when two or more adjacent components, for example $11_5$, $11_6$ or $11_7$, are simultaneously indicated as being defective. This measure takes account of the fact that the safety function is seriously impaired with the failure of two or more neighboring optoelectronic components.

In the same manner the diagnostic apparatus 21 can also retain the alarm state when a larger number of optoelectronic components, for example over 40%, are indicated by the component 44 as being defective.

After the initiation of an alarm state (appearance of the alarm signal 17) diagnostic cycling is preferably continued because there is a chance that the light grid will become ready for operation again, for example if a component which was initially indicated as being defective starts to operate again. Furthermore, a diagnostic cycle is also run at the start of operation of the light grid, i.e. when it is switched on.

Through the diagnostic method of the invention the availability of a safety light grid, in particular of a safety light grid for an elevator, is decisively improved until the next service is carried out, without the safety function being intolerably impaired. The safety function can indeed be retained in its entirety if, when using the diagnostic method of the invention, the spacing of the individual light transmitters and light receivers is so reduced that a predetermined obstacle recognition resolution is ensured even with the failure of a single optoelectronic component and the switching off of the corresponding light transmitter-receiver pair.

I claim:

1. A light grid comprising a row of adjacent light transmitters and, spaced therefrom, a row of adjacent light receivers, each light transmitter being associated with a light receiver to thereby define pairs of associated light transmitters and receivers, sensing means for scanning the light receivers and determining for each light receiver whether or not a light received signal is present, and alarm means for generating one of an alarm signal and a warning signal when no light received signal is detected, each light transmitter forming a light beam illuminating the associated light receiver and at least one adjacent light receiver, whereby the light receivers receive light from the associated light transmitters and at least one adjacent light transmitter, means operative in the absence of a light received signal at a given light receiver for determining during the activation of the light transmitter associated with the given light receiver if the light receiver adjacent to the given light receiver receives light from the light transmitter associated with the given light receiver, or the given light receiver receives light from the adjacent light transmitter, the last-mentioned means including means for storing light received signals or the absence of light received signals, obtained during a predetermined number of scans of the light receivers by the sensing means, and diagnostic means responsive to an absent light received signal to determine if the presence of an object between the rows appears probable or the presence of a defective light transmitter and/or receiver appears probable, the alarm means continuing to generate the alarm signal when the presence of an object appears probable and replacing the alarm signal with a warning signal when the presence of a defective light transmitter and/or receiver appears probable.

2. Light grid in accordance with claim 1 including a timer associated with each light receiver, the timer being activated when a light received signal expected at the associated receiver does not appear, and stopped and reset when an expected light received signal occurs again at the associated light receiver within a preset time.

3. Light grid in accordance with claim 1 wherein the diagnostic apparatus includes receiver control means for initiating at least one further scan of the light receivers which receive light from a light transmitter other than the associated light transmitter; the light grid further including a light received signal evaluation stage operatively coupled with the alarm means for causing the alarm means to generate the alarm signal in the absence of an expected light received signal during a scan of the light receivers by the sensing means and to convert the alarm signal into a warning signal when there is an absence of the light received signal at the given light receiver when illuminated by the associated light transmitter and a presence of the light received signal when the given light receiver is illuminated by light from the adjacent light transmitter and/or a light received signal is present at the light receiver adjacent to the given light receiver when illuminated by the light transmitter associated with the given light receiver.

4. Light grid in accordance with claim 1 including an elevator having a sliding door with oppositely disposed closing edges, and wherein the light grid is installed at the oppositely disposed closing edges of the sliding door.

5. A method for detecting defective light transmitters and/or light receivers of a light grid for detecting objects in a surveillance area, the light grid including a first row of light transmitters each capable of emitting light when energized, a second row of light receivers each capable of generating an output indicating whether or not it is illuminated by light from a light transmitter, the rows of transmitters and receivers being spaced apart to define the surveillance area, each light receiver in the second row being operatively associated with a light transmitter in the first row to define pairs of associated light transmitters and light receivers, each associated light transmitter having at least one adjacent light transmitter in the first row located proximate and on a side of the associated light transmitter, and each associated light receiver having at least one adjacent light receiver in the second row located proximate and on a side of the associated light receiver, the method comprising the steps of a) positioning the light transmitters and the light receivers so that each light receiver can be illuminated with light from the associated light transmitter and at least one adjacent light transmitter, b) emitting light from the transmitters in the first row, c) sensing the output of the light receivers when illuminated by light emitted by at least one of the corresponding associated light transmitters and the adjacent light transmitters, d) upon failure to sense an output indicating illumination of a given light receiver, determining whether the adjacent light receiver has an output indicating illumination by at least one of the light transmitter associated with the given light receiver and the adjacent light transmitter, e) generating an alarm signal upon sensing an output indicating the absence of illumination of the given light receiver by at least one of the associated light transmitter and the adjacent light transmitter, f) investigating if the absence of light illumination of the given light receiver is due to a probable presence of an object in the surveillance area, or due to a probable defective light transmitter or defective light receiver, g) continuing generating the alarm signal if the investigating step resulted in a determination that the output indicating the absence of illumination of the given light receiver is due to the probable presence of an object in the surveillance area, and h) replacing the alarm signal with a warning signal if the investigating step resulted in a determination that the output indicating the absence of illumination of the given light receiver is due to the probable presence of a defective light transmitter or light receiver.

6. A method according to claim 5 wherein the step of emitting comprises sequentially energizing the light receivers in the second row.

7. A method according to claim 6 including the step of repeating the step of sequentially energizing the light transmitters.

8. A method according to claim 7 wherein steps d) to h) are carried out after a plurality of repeating steps over a predetermined length of time and after the sensing step repeatedly determined the absence of the output indicating light illumination of the given light receiver over the predetermined length of time.

9. A method according to claim 8 wherein the predetermined length of time is in a range of between about 1 to 2 minutes.

* * * * *